F. RADCLIFFE.
CAR JOURNAL BEARING AND LUBRICATING MEANS THEREFOR.
APPLICATION FILED DEC. 2, 1920.

1,426,102.

Patented Aug. 15, 1922.
2 SHEETS—SHEET 1.

Fred Radcliffe, Inventor

By _____ Attorney

F. RADCLIFFE.
CAR JOURNAL BEARING AND LUBRICATING MEANS THEREFOR.
APPLICATION FILED DEC. 2, 1920.

1,426,102.

Patented Aug. 15, 1922.
2 SHEETS—SHEET 2.

Fred Radcliffe, Inventor
By [signature] Attorney

UNITED STATES PATENT OFFICE.

FRED RADCLIFFE, OF PHILADELPHIA, PENNSYLVANIA.

CAR JOURNAL BEARING AND LUBRICATING MEANS THEREFOR.

1,426,102.   Specification of Letters Patent.   Patented Aug. 15, 1922.

Application filed December 2, 1920. Serial No. 427,720.

*To all whom it may concern:*

Be it known that I, FRED RADCLIFFE, a citizen of the United States of America, residing at Philadelphia, in the county of Philadelphia and State of Pennsylvania, have invented new and useful Improvements in Car Journal Bearings and Lubricating Means Therefor, of which the following is a specification.

The object of the invention is to provide a relatively simple and efficient construction of car journal bearing and attendant lubricating means whereby the wear upon the journal elements or members may be minimized, and more particularly whereby the condition of the bearing, especially in the matter of its supply of lubricating material may be readily ascertained by the inspector or attendant whose duty it is to supply oil to the bearings, without resorting to the expedient necessary in accordance with the usual practice of opening the journal box, and furthermore to provide in connection with the journal box an indicator of the condition so far as the lubricant is concerned which can be read at a glance and which will serve without relying upon the judgment of the operator to indicate whether or not it is necessary to supply additional oil or refill the fount of the bearing; and with these objects in view the invention consists in a construction and combination of parts of which a preferred embodiment is shown in the accompanying drawing;—wherein:

Figure 1:
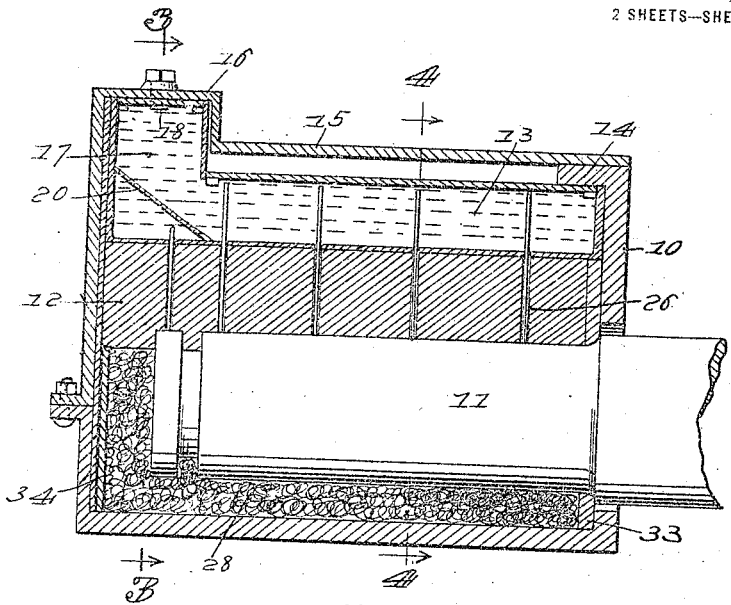
Figure 1 is a longitudinal sectional view of a bearing constructed in accordance with the invention showing an axle spindle in connection therewith.
Figure 2:
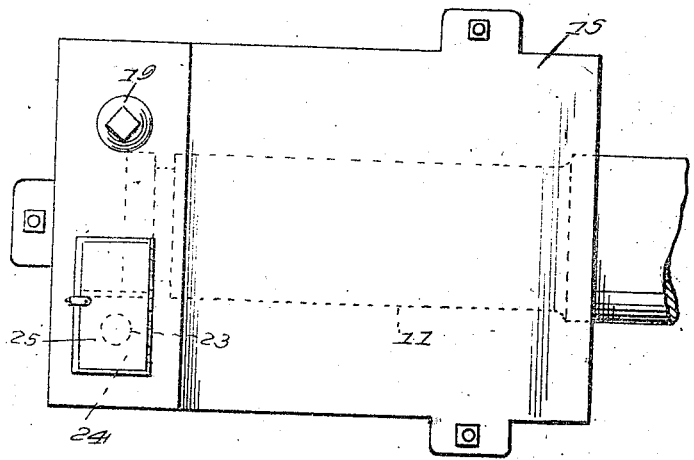
Figure 2 is a plan view of the same.

The bearing embodying the invention consists especially of the box, casing, or housing 10 for receiving the axle spindle 11, and a bearing block or brass 12 seated as in the usual practice upon the spindle and carrying, preferably as an integral part thereof, a fount or oil reservoir 13 extending throughout the length of the spindle and housing and fitted at its inner end under an overhanging flange 14 to which is secured the box cover 15. At its outer end the box is provided with an upwardly extending offset 16 into which extends a corresponding offset 17 of the fount or reservoir which is provided with a filling tube 18 extending upward through an opening in the box cover where it is fitted with a removable cap 19 adapted to be displaced to permit of supplying the reservoir with oil.

The outer end of the fount or reservoir is also preferably provided with an inclined platform or shed 20 upon which bears the lower end of an indicator tube 21 movably fitted in an opening 22 in the top of the reservoir and journal casing with a funnel 23 at its upper end disposed in a receptacle 24 accessible by means of a hinged lid or cover 25. When a fount or reservoir is charged with the requisite supply of lubricating oil the indicator tube and funnel should be correspondingly filled and, by reason of the fact that the lower end of said tube is submerged in the contents of the fount the oil will remain in the indicator tube and thus will be visible to an inspector merely on raising the lid or cover 25 until the level of the oil in the fount has fallen to a point sufficient to expose the lower end thereof, whereupon the oil will flow out of the indicator tube and the absence of the same in the funnel which is visible upon opening the lid will warn the spectator that it is necessary to refill the fount. The refilling of the latter should obviously be supplemented by refilling the indicator tube.

Oil is fed to the surface of the spindle by means of vertical ducts 26 formed in the bearing block or brass in communication with the interior of the fount or reservoir, and for maintaining a free passage of the oil and to serve as an additional means of conveying the same to the surface of the spindle, feed wires or rods 27 are fitted in said ducts in terminal contact with the surface of the spindle. The slight vibration which these rods or wires receive, due to the rotation of the spindle, will serve to induce a proper and regulated flow of lubricant to the surface of the spindle and preferably a filling or packing 28 of fibrous material such as waste is arranged in the casing or housing beneath and at the end of the spindle to absorb and hold the oil in contact with the spindle.

The bearing block or brass is held against lateral displacement and is centered in the box or casing by means of lateral downwardly divergent wings 29 reenforced by webs 30 and provided at their outer sides with impact ears 31 which may be struck to force the inner end of the block or brass to its seat under the overhanging flange 14 so as to insure a proper relation between the block or brass and the axle spindle.

It is a well recognized fact that many of the accidents in railroading are due to the carelessness or superficiality with which the bearing boxes are inspected by those operatives who are entrusted with that duty, and the consequent overheating of the bearings or the unnecessary wearing of the spindles and bearing elements including the blocks or brasses, and in many instances the failure to supply oil to the bearings when needed is due to the difficulty of ascertaining the true condition of a bearing or determine whether or not there is a sufficient supply of oil to last until the car reaches the next supply station, but with an arrangement such as that above described the fact as to whether or not the oil in the fount or reservoir has been lowered to the plane indicating the necessity for a fresh supply or charge of oil will be apparent at a glance, and such indication by reason of the arrangement disclosed will be given before the oil in the fount has become entirely exhausted, due to the fact that the location of the lower end of the indicator tube upon the surface of the inclined plate or shed 20 is above the plane of the bottom of the fount or reservoir, and hence will be uncovered to permit of the escape of the contents of said tube while there remains a sufficient quantity of oil in the bottom of the fount to supply the journal for a considerable length of time.

Figures 3, 4:
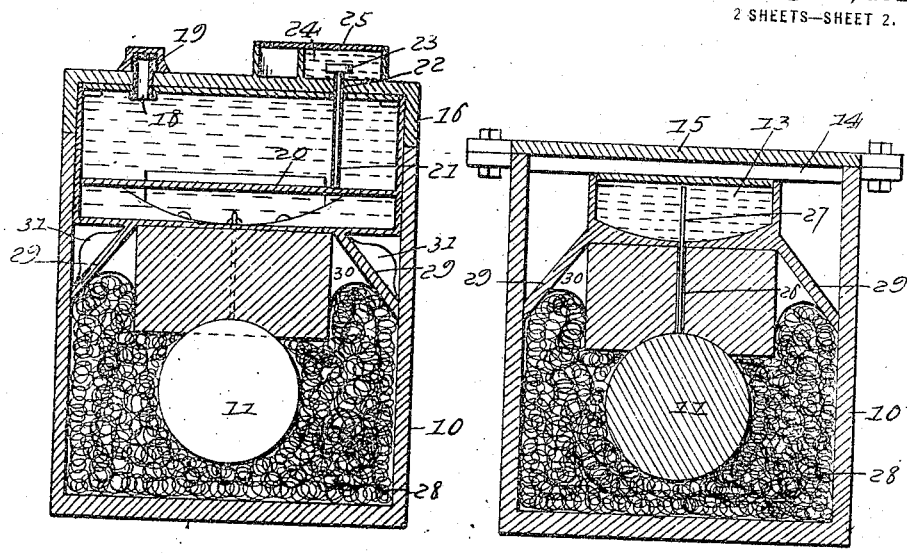
Figure 3 is a cross section of the plane indicated by the line 3—3 of Figure 1.
Figure 4 is a similar section of the plane indicated by the line 4—4 of Figure 1.
Figure 5:
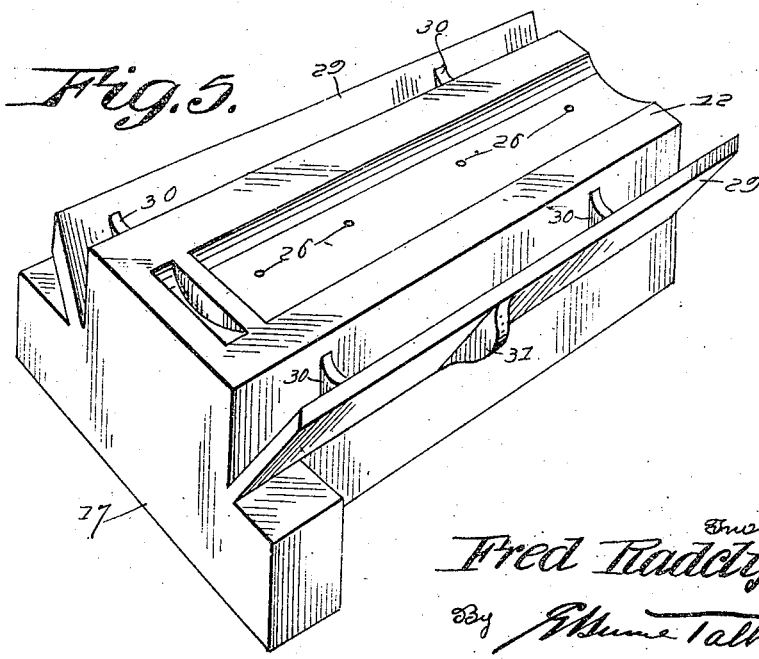
Figure 5 is a detail perspective view of the bearing block or brass inverted.

As indicated in Figure 4 the bottom of the fount or reservoir is preferably depressed toward the line of communication of the feed ducts 26 therewith so as to insure the economical feeding of the oil to said ducts when the supply is low in the fount.

As a means of retaining the packing or filling of the journal box and as a supplemental means of positioning the box with reference to the axle spindle it is preferable to apply a washer plate 33 to the shoulder of the axle, the same having an opening of a diameter corresponding with that of the spindle so that it may be threaded or slipped longitudinally upon the spindle from the outer or free end thereof and being of rectangular form or of a shape in plane corresponding with that of the journal box below the plane of the bottom of the reservoir 13, so that when the journal box is fitted in place and the fount or reservoir has been inserted beneath the overhanging flange 14, the said washer will be locked in position and serve as a means of effectually closing the opening in the inner end of the box. Also a plate 34 should be fitted into the front end of the box in guides or grooves in the side walls thereof to occupy a position between the front or outer wall of the box and the filling or packing material which is interposed between the same and the end of the spindle.

Having described the invention what is claimed as new and useful is:—

1. A journal bearing having a box or casing, and a bearing block or brass surmounted by an oil fount or reservoir, said box or casing being provided at is inner end with an overhanging flange for engagement with the adjacent end of said fount or reservoir, and the block or brass being provided with downwardly divergent lateral centering wings having exterior impact ears.

2. A journal bearing having a box or casing, and a bearing block or brass surmounted by an oil fount or reservoir, said box or casing being provided at its inner end with an overhanging flange for engagement with the adjacent end of said fount or reservoir and the block or brass being provided with downwardly divergent lateral centering wings having exterior impact ears, a washer plate being threaded upon the spindle portion of the axle for contact with the axle shoulder and the inner end wall of the box or casing and held in place by said oil fount or reservoir which rests upon the upper edge thereof.

3. A journal bearing having in combination with an enclosing box or housing, a block or brass surmounted by a fount or reservoir and provided with feed ducts leading from the bottom of said fount or reservoir to the spindle bearing surface of the block or brass, the outer end of the fount or reservoir being provided with an inclined platform or shed, and an indicator tube movably fitted in the opening in the top of the reservoir and journal casing and provided with a funnel at its upper end, the lower end of said tube having bearing contact on said inclined platform, the journal casing being formed with a receptacle in which the funnel end of said tube is disposed.

4. A journal bearing having a box or casing, and a bearing block or brass surmounted by an oil fount or reservoir, said box or casing being provided at its inner end with an overhanging flange for engagement with the adjacent end of said fount or reservoir and the block or brass being provided with downwardly divergent lateral centering wings having abutting engagement at their lower edges with the side walls of the box or casing.

In testimony whereof he affixes his signature.

FRED RADCLIFFE.